(12) United States Patent
Fogarty et al.

(10) Patent No.: US 6,504,261 B2
(45) Date of Patent: Jan. 7, 2003

(54) SYNCHRONOUS GENERATOR HAVING AUXILIARY POWER WINDINGS AND VARIABLE FREQUENCY POWER SOURCE AND METHOD FOR USE

(75) Inventors: James Michael Fogarty, Schenectady, NY (US); Brian Ernest Baxter Gott, Delanson, NY (US); John Russell Yagielski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 09/935,733

(22) Filed: Aug. 24, 2001

(65) Prior Publication Data

US 2001/0054823 A1 Dec. 27, 2001

Related U.S. Application Data

(63) Continuation of application No. 09/571,812, filed on May 16, 2000.

(51) Int. Cl.[7] .................................................. H02P 9/08
(52) U.S. Cl. .......................................... 290/52; 322/59
(58) Field of Search ............................... 322/11, 13, 59, 322/63; 290/52, 40 R, 2, 46

(56) References Cited

U.S. PATENT DOCUMENTS

| | | | |
|---|---|---|---|
| 3,764,815 A | 10/1973 | Habock et al. | 290/52 |
| 4,308,463 A | 12/1981 | Giras et al. | 290/1 |
| 4,336,486 A | 6/1982 | Gorden et al. | 322/63 |
| 4,385,252 A | 5/1983 | Butman, Jr. et al. | 310/214 |
| 4,910,421 A | 3/1990 | VanSchaick et al. | 310/68 D |
| 4,948,209 A | 8/1990 | Baker et al. | 322/10 |
| 5,325,042 A * | 6/1994 | Murugan | 322/10 |
| 5,689,141 A * | 11/1997 | Kikkawa et al. | 290/52 |
| 5,930,134 A | 7/1999 | Glennon | 363/127 |
| 5,966,925 A * | 10/1999 | Torikai et al. | 60/778 |
| 6,281,595 B1 * | 8/2001 | Sinha et al. | 290/40 A |
| 6,333,622 B1 * | 12/2001 | Fogarty et al. | 322/90 |

* cited by examiner

*Primary Examiner*—Nicholas Ponomarenko
(74) *Attorney, Agent, or Firm*—Nixon & Vanderhye P.C.

(57) ABSTRACT

A synchronous generator is disclosed having main power windings and auxiliary power windings, where the auxiliary power winding is coupled to a variable frequency drive system. The variable frequency drive causes the generator to function as a motor and turn a drive shaft to start a gas turbine. Switching circuits are used to connect and disconnect the auxiliary windings of the generator with the variable frequency power supply.

5 Claims, 3 Drawing Sheets

SYNCHRONOUS GENERATOR HAVING AUXILIARY POWER WINDINGS AND VARIABLE FREQUENCY POWER SOURCE AND METHOD FOR USE

This application is a division of application Ser. No. 09/571,812, filed May 16, 2000, now pending, the entire content of which is hereby incorporated by reference in this application.

BACKGROUND OF THE INVENTION

The invention generally relates to the field of synchronous power generators, such as those used in combination with gas turbines. Specifically, the invention relates to synchronous generators having both a power and auxiliary windings.

Synchronous power generators are commonly used by power utilities to produce electrical energy. Generators generally have a magnetic rotor that is surrounded by a stationary stator having conductive windings. Rotating magnetic field from the spinning rotor creates electric current in the armature windings in a stationary stator that surrounds the rotor. The current from these windings is output as electrical power from the generator. The stator generally has two or three armature windings, each of which have an induced current. These currents are synchronous, but out-of-phase with each other. The generator produces two- or three-phase alternating current as electrical power usable by electric power utilitliy companies.

Synchronous power generators are often driven by gas turbines. Gas turbines have a rotating drive shaft that is coupled to the drive shaft and rotor of the generator. When running, the gas turbine turns the drive shaft and rotor causes the power generator to produce electricity. In these gas turbine and generator power units, the generator is commonly adapted to alternatively function as a starting motor for the gas turbine. To start the gas turbine, the generator may be temporarily operated as a motor that is powered from an auxilary electrical power source. Once the generator/motor accelerates the rotational speed of the drive shaft sufficiently to start the gas turbine, the gas turbine is started. Once started, the gas turbine begins to output power to the driving the drive shaft and the generator, and the motor is switched back to operate as a generator.

A variable frequency power supply that drives a generator as a motor to start a gas tubine is referred to as a "static start" drive. The static start variable frequency power supply applies current to the stator windings of the generator. The magnetic fields created by the current in the stator windings cause the generator rotor to turn which, in turn, powers the drive shaft. The power supply gradually increases the frequency of the current applied to the stator to increase the rotational speed of the rotor. As the rotational speed of the rotor and drive shaft increases, the turbine is accelerated to its rated starting speed, and the turbine becomes self-sustaining and generates output power to drive the generator.

The General Electric Company has previously sold and marketed gas turbine and generator power units that have "static start" capabilities. FIG. 1 illustrates a conventional three-phase synchronous generator 10 that is coupled to a static start drive 12 which provides variable frequency power to drive the generator 10 as a motor in order to start a gas turbine. The static start drive 12 is switchably coupled to the three-phase output lines 14 of the armature of the generator. The output of the generator is normally connected to a closely balanced power transmission system 16. A disconnect breaker or other switch 18 connects the static start drive 12 to the output line 14 of the generator. When the breaker 18 is closed, the static start drive 12 applies power to drive the generator as a motor and start the gas turbine.

Power to drive the static start drive 12 is provided by an auxiliary power bus 20. The static start drive provides a variable frequency power to drive the generator as a motor during the gas turbine start-up mode. Once the gas turbine is running and self-sufficient, a disconnect breaker or switch 18 disconnects the static start drive from the output power lines 14 of the generator. The generator ceases being a motor and instead becomes a generator driven by the gas turbine. Electrical power provided by the generator can be applied to the balance of the power system which requires electrical power from the generator.

The static start drive is typically formed of non-moving (hence the term static) solid-state devices such as a load-commutated inverter (LCI) or pulse-width modulated (PWM) drive formed from solid-state rectifiers, diodes and other such devices. The LCI or PWM may be used to provide a variable frequency power supply from the constant frequency power supply (typically 50 Hertz (Hz) or 60 Hz) provided from the station auxiliary power bus 20. The excitation supply 22 is also powered by the auxiliary power bus 20 and is coupled to a field winding 24 of the generator.

The static start drive system generally uses a variable frequency power supply having sufficient capacity to be compatible with the generator armature winding terminals. For existing gas turbine generator systems, the armature voltage is typically in the range of 10 kV to 20 kV. The voltage of the static start drive is typically in the range of 2.3 kV to 7 kV. This range is sufficiently close to the normal operating range of the generator armature voltage for the static start drive to be applied directly to the main power windings of the generator. Moreover, for a properly-designed static start system, the voltage and current specifications of the static start drive matches the electrical characteristics of the generator to provide the required accelerating torque to the generator rotor. This matching of the static start drive system to the armature voltage of the generator is possible for generators having normal operating ranges of 10 kV to 20 kV.

FIG. 2 shows a conventional generator having an auxiliary power winding used for exciting the generator when the generator is operating in generator mode. In particular, a generator 10 having a three-phase main power winding output 26 that provides power to a balance of the power system 16, including the power system beyond the generator terminals, such as transformers, circuit breakers, transmission lines and other electrical loads in the power system. In addition, the generator has auxiliary power windings which are represented by the outputs lines 28 to those windings. The General Electric Company has developed synchronous generators having both main power windings and auxiliary power windings. In particular, the GENERREX™ excitation system includes auxiliary power windings in synchronous generators, such as is described in U.S. Pat. Nos. 4,910,421; 4,682,068 and 4,477,767.

In addition, auxiliary windings in synchronous generator/motor machines have been proposed in Naval ship propulsion systems. In particular, the main generator windings would provide power to electric motors coupled to the propeller shaft. The auxiliary windings would provide power to the shipboard power distribution system for lights, motors and other ship functions.

High voltage generators have been developed that operate at normal transmission line voltages of 40 kV to 400 kV.

These generators produce output power in the range of normal transmission line voltage, which is substantially greater than the output voltage range of prior generators and well beyond the voltage range of the power supply for a static start system. High voltage generators have armature windings that operate in 40 kV to 400 kV. It is believed to be impractical to couple a static start drive (which operates in the range of 2.3 kV to 7 kV) to supply the high voltage windings in a high voltage generator while providing reasonable starting torque. Accordingly, there is a need for static start drive system which may be coupled to high voltage generators.

In addition, the static start drive system can be applied to synchronous generators which are being operated as synchronous condensers. Synchronous condensers are operated in power systems to supply reactive power to assist in maintaining desired voltage levels. The condensers provide no real power to the system. Synchronous condensers are generally applied to provide reactive power that leads real power to offset or cancel normal lagging reactive power in a power load system.

BRIEF SUMMARY OF THE INVENTION

A novel system has been developed which combines a static start drive with auxiliary power windings to provide a generator with the ability to use high voltage generators to start gas turbines, serve as a synchronous condenser, and perform other functions. In one embodiment of the invention, a static start drive is connected to the auxiliary winding of a high voltage synchronous generator. The auxiliary winding has winding characteristics, e.g., such as voltage and current capabilities, that are suitable for connection to a static start drive, or other auxiliary load or excitation system. The main windings of the generator may be designed for much higher voltages and would not be suitable for a static start drive.

Applying a static start drive to an auxiliary power winding of a high voltage generator allows the static start system to be used with a high voltage generator. Starting a gas turbine using a variable frequency power supply attached to an auxiliary winding in a high voltage generator allows the static start technique to be used with a wider variety of generators, e.g., high voltage generators than was previously available. In addition, providing two windings in the generator increases the flexibility in its uses. By separating the main windings from the auxiliary windings, the characteristic of each type of windings may be selected to best suit different applications of the same generator. In particular, the auxiliary windings may be designed specifically to work in conjunction with the static start drive, and the main windings may be designed to connect to a high voltage transmission line.

Alternatively, the auxiliary windings to the static start drive may have previously existed in the generator for other purposes. For example, the GENERREX excitation system employs auxiliary windings that are separate from the main power windings and are formed by a series of conductors placed in the stator slots with the main windings. These conductors form distinctive three-phase auxiliary windings separate from the main windings. By making use of existing auxiliary windings in a generator, a generator may be converted to include a static start drive system without making major internal modifications to the generator. For example, a static start system may be added to a high voltage generator with existing auxiliary without adding additional stator windings and without having to couple the static start drive to the main stator windings of the generator. In addition, use of auxiliary windings in a high voltage generator provides a means suitable for placing balanced currents in the winding region of the stator core. The combination of conductor placement and current forms a rotating magnetic field for driving the generator as a motor.

Balanced windings and balanced currents are used to create a magnetic field that rotates within the motor or generator at synchronous speed. Windings are said to be balanced if they are geometrically identical and equally placed around the periphery of the stator core (every 120°). Currents are said to be balanced if the current in each of the phases has the same magnitude (amperes), and the time phase of the alternating currents differ by a predetermined angle, typically 120° for a three phase winding. Balanced currents flowing in the balanced winding produce a magnetic field in the gap between the rotor and stator that is constant in magnitude and spins in synchronism with the rotor.

BRIEF DESCRIPTION OF THE DRAWINGS

These and other features and benefits of the present invention will be more fully understood by careful study of the following more detailed description of preferred exemplary embodiments of the invention.

DETAILED DESCRIPTION OF PREFERRED EMBODIMENT

Figure 3:
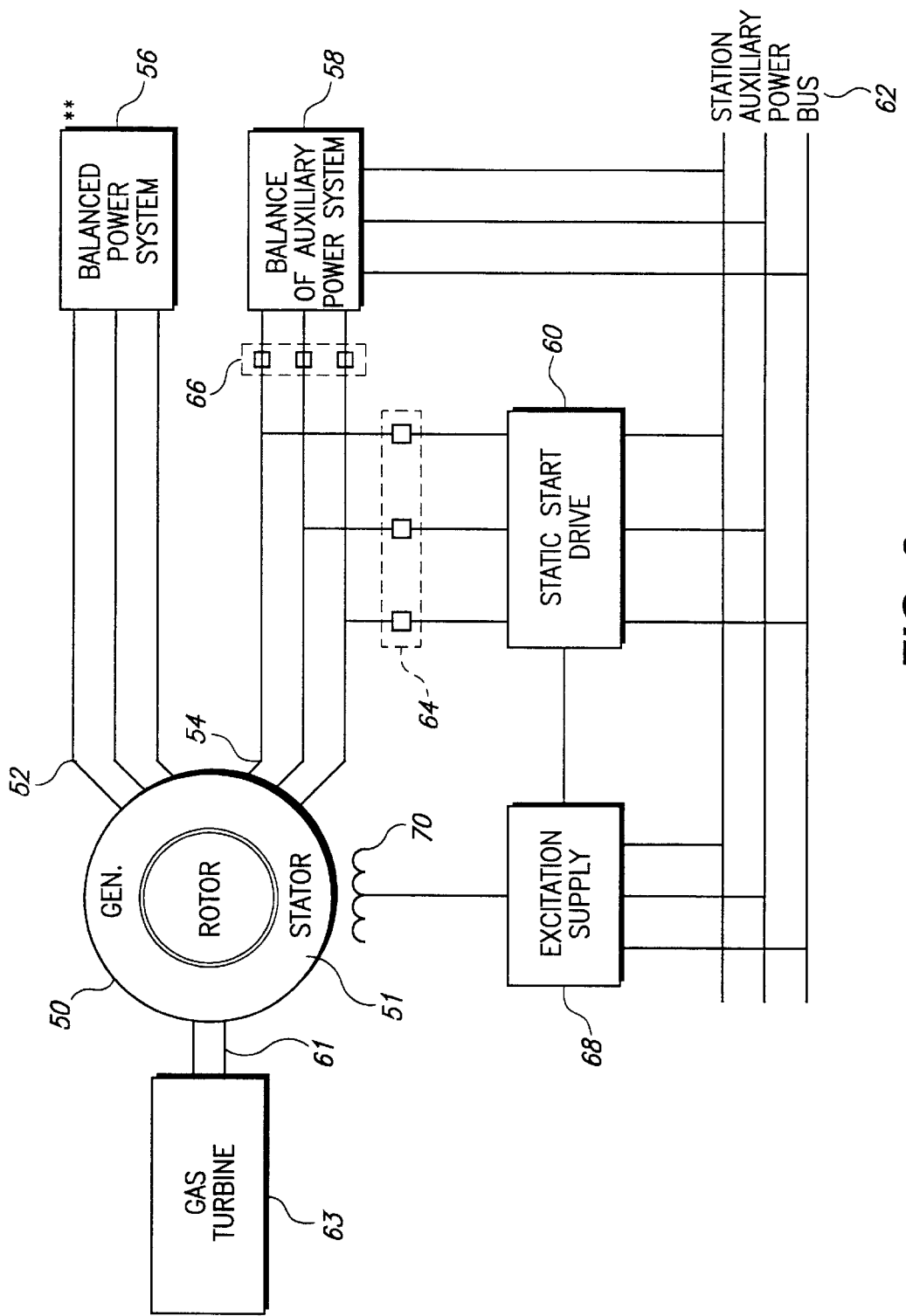
FIG. 3 is a schematic diagram of a novel static start system coupled to an auxiliary power winding of an auxiliary generator.

FIG. 3 shows a schematic diagram that generally shows a generator 50 having a stator 51 with both main power windings and auxiliary power windings represented by the main power winding armature output 52 and auxiliary power winding armature output 54. In the embodiment shown in FIG. 3, the main power winding armature 52 carries power to a balanced power load system 56. The load system may be a line transmission voltage system typically operating in the range of 40 kV to 400 kV. The voltages in these ranges may be directly provided from the generator 50 over its main power windings 52 to the balanced power system.

In addition, the generator 50 has an auxiliary power winding 54 that provides electrical power via its armature system to a balanced auxiliary power system 58. The auxiliary power system 58 may be a low voltage system or other auxiliary power load system. The auxiliary power load system may constitute the electrical loads in the power plant associated with the generator. A high voltage generator may output power at 400 kV, for example, which is too high for use within the plant. The auxiliary winding provides low voltage power from a high voltage generator.

The generator is able to provide electrical power via its main power windings to a power load system 56 which is operated at different voltages and currents than is the auxiliary power load system 58 which is also powered by the generator. The generator drives both main power system and auxiliary power system because it has main power windings 52 and auxiliary power windings 54.

A static start drive 60 may be coupled to the auxiliary power winding 54 of the generator. The static start drive may be a variable frequency power supply used to operate the generator as a motor and turn the rotor at a variable rotational speed proportional to the frequency of the static start drive. The rotor of the generator turns a drive shaft 61 coupled to a gas turbine 63 to start that turbine. The static start drive may also include a load-commutated inverter (LCI) or pulse width modulated (PWM) drive. Components for the variable frequency power drive may include rectifiers, diodes and other advanced solid-state electronic components. Driving power for the static start drive is provided from a station auxiliary power bus 62, which may provide three-phase current at 50 Hz or 60 Hz.

The static start drive is switchably connected to the auxiliary power winding 54 through a disconnect breaker or switch 64. Similarly, the auxiliary power bus 62 is switchably connected to the balance of the auxiliary power system 58 by a second disconnect breaker or switch 66. The disconnect breaker switch 64 for the static start drive is closed to couple the static start drive to the auxiliary power windings of the generator 50 when the generator is to be used as a motor to start a gas turbine, for example. The disconnect breaker 64 for the static start drive is closed to engage the static start drive to the auxiliary power windings of the generator. At the same time, the disconnect breaker 66 between the auxiliary power winding and balanced auxiliary power system 58 is opened to disconnect the auxiliary power winding from the auxiliary power system.

The breakers 64, 66, ensure that while the static start drive 60 is providing variable frequency power to the auxiliary power winding of the generator, the auxiliary power system 58 is not drawing power from the static start drive or generator. In addition, during static start operations, the auxiliary power system 58 should be disconnected from the auxiliary power winding 54 to avoid feeding variable frequency power into the auxiliary power system 58. Alternatively, when the static start drive is disconnected from the auxiliary power winding (such as after the gas turbine has been started and is self-sustaining), the first disconnect breaker 64 is opened and the second disconnect breaker 66 is closed. Thus, when the static start is off, the balance of the auxiliary power system 58 receives current from the auxiliary windings and provides that current to the auxiliary power bus 62.

An excitation supply 68 provides magnetizing power to the rotating generator field winding 70. Typically, the excitation system provides direct current (d.c.) to the field winding 70 at relatively-low voltages (300 to 700 volts) compared to the stator voltage in the generator 50. During the gas turbine start sequence, the excitation supply 68 supplies power to the field winding 70 at various levels that are functions of the turbine-generator speed. The static drive 60 and the excitation supply 68 are linked with a control circuit to provide the proper power levels during the turbine start sequence. Power for the excitation supply 68 may be provided from the auxiliary power bus 62.

The main windings of the generator 50 may have armature voltages in the range of 40 kV to 400 kV, which is well above the voltages suitable for static start drive systems. The auxiliary winding may have armature winding voltages in the range of 2 to 7 kV, which is suitable for connecting to a static drive system. The winding voltages may increase with advances in solid state electronics. Accordingly, the present system allows for a static start drive 60 to be coupled to a high voltage generator 50. The auxiliary windings 54 may be sized to match the variable frequency power supply provided by the static start drive 60.

Figure 1:
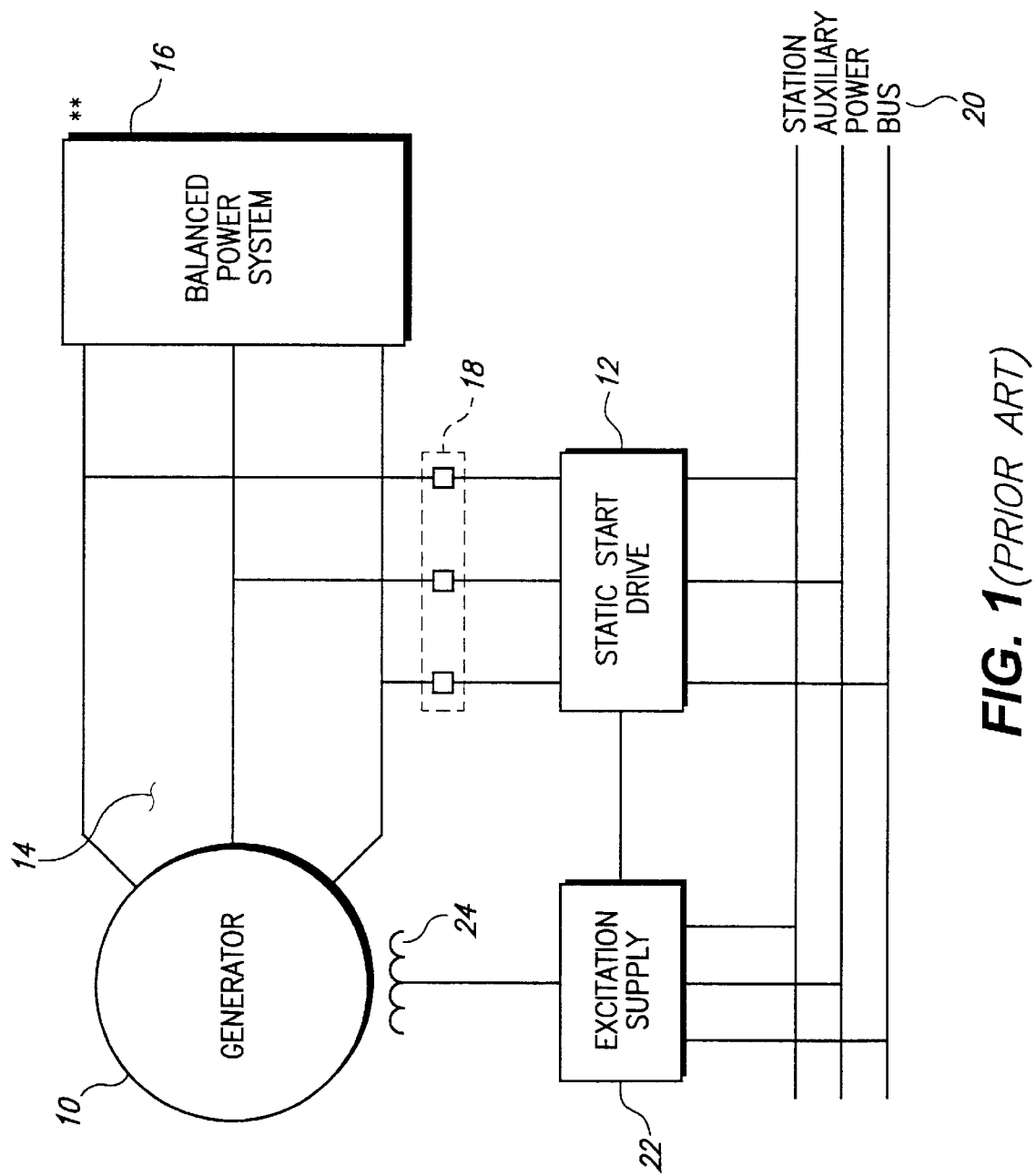
FIG. 1 is a schematic diagram showing a conventional static start drive system coupled to a generator.
Figure 2:
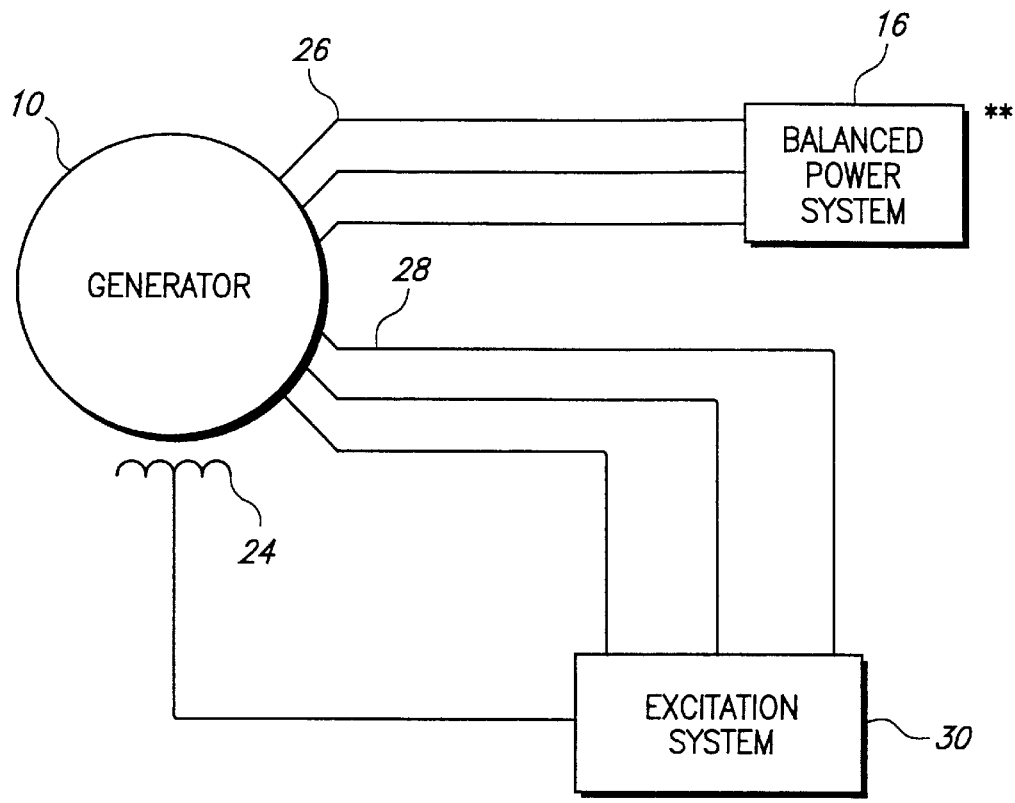
FIG. 2 is a schematic diagram showing a conventional generation system coupled to an auxiliary power winding of a generator.
Figure 4:
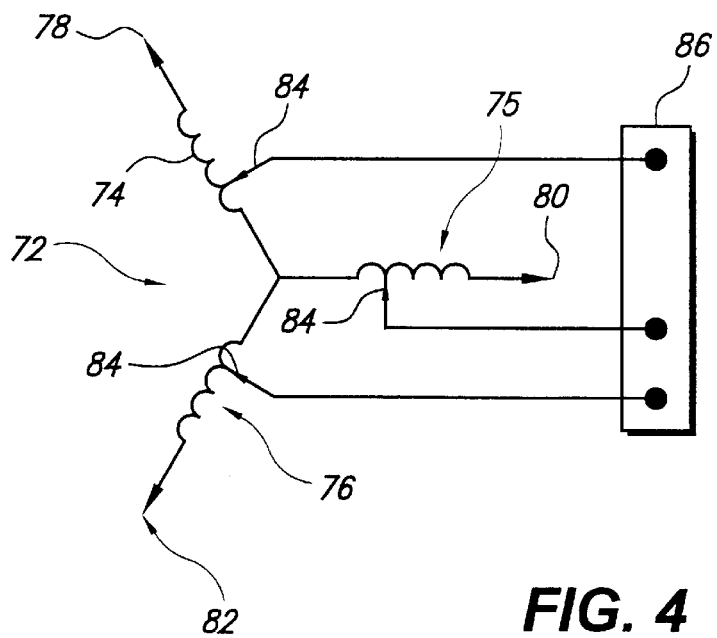
FIG. 4 is a schematic diagram of a three-phase main windings system having taps to provide an auxiliary winding function for a generator.

FIG. 4 is a schematic circuit showing an auxiliary power winding formed by tapping the turns of a main power winding. A three-phase main power winding system 72 is shown by the three branch windings 74, 75 and 76 of the main windings of generator 50. The outputs of the main windings 78, 80 and 82 provide three-phase power, such as high voltage power for direct connection to line transmissions. The main windings have power taps 84 that connect to the end turns of one of the first few turns of the main power winding. These taps allow current to be extracted from the main windings at a point where the voltage is relatively low as compared to the voltage across all of the turns in the main windings. By tapping the first few turns of the main power winding, an effective auxiliary winding may be created which provides polyphase (e.g., three phase), low-voltage and low-amperage current at an auxiliary connection bar 86. The auxiliary connection bar 86 may be used to couple to the first breaker or switch 64 and to the balance of the auxiliary power system 58.

The present static drive system coupled to auxiliary windings may be generally applied to polyphase synchronous electrical machines during their start-up phases. As described above, the present system is particularly suitable for use with generators that operate in connection with gas turbines and provide output voltages that are substantially greater than those voltages of typical power conversion systems, such as rectifiers, LCI and PWM drives. Moreover, the present system may be employed with a variety of auxiliary windings, including those that tap main power windings, are formed of additional conductors included with main windings in a stator, and other polyphase synchronous electrical machines that have auxiliary winding systems which match static start drive systems.

While particular exemplary embodiments of the present invention have been described and illustrated, it should be understood that the invention is not limited to the disclosed exemplary embodiments. Modifications and variations may be made by persons skilled in the art while still retaining some or all of the advantages of this invention. The present invention is intended to include any and all such modifications within the spirit and scope of the following claims.

What is claimed is:

1. A method for starting a gas turbine using a polyphase electric power generator comprising the steps of:
   a. connecting a variable frequency power supply to auxiliary windings of the generator;
   b. applying current to the auxiliary windings of the generator to turn a drive shaft of the generator;
   c. rotating a gas turbine with the turning rotor of the generator to start the gas turbine, and
   d. once started, the gas turbine turns the generator to cause the generator to produce electric power from the main armature windings.

2. A method for starting a gas turbine using a polyphase electric power generator as in claim 1 further comprising the step of disconnecting the variable frequency power supply from the auxiliary windings after the gas turbine is started.

3. A method for starting a gas turbine using a polyphase electric power generator as in claim 1 further comprising the step of increasing the frequency of the power applied by the variable frequency power supply to accelerate the rotational speed of the drive shaft as the gas turbine is being started.

4. A method for starting a gas turbine using a polyphase electric power generator as in claim 1 wherein the generator is a three-phase generator having three main windings having an output voltage in a range of 40 kilovolts (kV) to 400 kV, and three auxiliary windings having an output voltage of less than 10 kV.

5. A method for starting a gas turbine using a polyphase electric power generator as in claim 1 further comprising the step of disconnecting the variable frequency power supply after the gas turbine is started and connecting the auxiliary windings to an auxiliary power system.

* * * * *

UNITED STATES PATENT AND TRADEMARK OFFICE
CERTIFICATE OF CORRECTION

PATENT NO.   : 6,504,261 B2
DATED        : January 7, 2003
INVENTOR(S)  : Fogarty et al.

It is certified that error appears in the above-identified patent and that said Letters Patent is hereby corrected as shown below:

<u>Column 1,</u>
Line 29, kindly delete "utilitliy" and insert -- utility -- therefor.
Line 40, kindly delete "auxilary" and insert -- auxiliary -- therefor.
Line 47, kindly delete "tubine" and insert -- turbine -- therefor.

Signed and Sealed this

Twenty-second Day of April, 2003

JAMES E. ROGAN
*Director of the United States Patent and Trademark Office*